(12) United States Patent
Frick

(10) Patent No.: US 6,987,901 B2
(45) Date of Patent: Jan. 17, 2006

(54) OPTICAL SWITCH WITH 3D WAVEGUIDES

(75) Inventor: Roger L. Frick, Hackensack, MN (US)

(73) Assignee: Rosemount, Inc., Eden Prairie, MN (US)

( * ) Notice: Subject to any disclaimer, the term of this patent is extended or adjusted under 35 U.S.C. 154(b) by 167 days.

(21) Appl. No.: 10/379,284

(22) Filed: Mar. 3, 2003

(65) Prior Publication Data

US 2003/0223681 A1 Dec. 4, 2003

Related U.S. Application Data

(60) Provisional application No. 60/360,946, filed on Mar. 1, 2002.

(51) Int. Cl.
*G02B 6/26* (2006.01)
*G02B 6/42* (2006.01)

(52) U.S. Cl. .............................. 385/23; 385/18; 385/22; 385/37; 385/42; 359/872; 359/877

(58) Field of Classification Search ................. 385/10, 385/14, 16–18, 22, 23, 30, 37, 42; 359/872, 359/877

See application file for complete search history.

(56) References Cited

U.S. PATENT DOCUMENTS

| | | | |
|---|---|---|---|
| 3,514,183 A | 5/1970 | Rabedeau | 359/222 |
| 3,947,630 A | 3/1976 | Javan | 348/40 |
| 4,013,000 A | 3/1977 | Kogelnik | 385/17 |
| 4,111,524 A | 9/1978 | Tomlinson, III | 385/37 |
| 4,115,747 A | 9/1978 | Sato et al. | 372/26 |
| 4,165,155 A | 8/1979 | Gordon, II et al. | 359/222 |
| 4,257,016 A | 3/1981 | Kramer, Jr. et al. | 359/305 |
| 4,303,302 A | 12/1981 | Ramsey et al. | 385/23 |
| 4,356,730 A | 11/1982 | Cade | 73/514.26 |
| 4,387,955 A | 6/1983 | Ludman et al. | 385/37 |
| 4,498,730 A | 2/1985 | Tanaka et al. | 385/18 |
| 4,571,024 A | 2/1986 | Husbands | 385/37 |
| 4,626,066 A | 12/1986 | Levinson | 385/22 |
| 4,657,339 A | 4/1987 | Fick | 385/18 |

(Continued)

FOREIGN PATENT DOCUMENTS

DE 36 02 653 7/1987

(Continued)

OTHER PUBLICATIONS

International Preliminary Examination Report from PCT/US 03/06658.

(Continued)

*Primary Examiner*—Akm Enayet Ullah
*Assistant Examiner*—Daniel Petkovsek
(74) *Attorney, Agent, or Firm*—Marshall, Gerstein & Borun LLP

(57) ABSTRACT

An optical switch for routing optical signals between optical fibers is shown. Signals are guided internally in an optically transparent substrate by buried waveguides that are directly coupled to the optical fibers. These waveguides form a 3-dimensional optical routing structure internal to the substrate. Signals are coupled between adjacent waveguides by total internal reflection at the surfaces of the substrate. A moveable diffraction grating is coupled to these optical signals at points of total internal reflection via evanescent coupling. This coupling causes a change in direction of the optical signal and routes the signal to the desired waveguide. Known techniques can be used to form the waveguides by writing them with a pulsed laser. Local heating causes a permanent increase in refractive index that forms a single mode waveguide structure. The resulting device has low losses and can be formed by low cost MEMs processes.

25 Claims, 11 Drawing Sheets

U.S. PATENT DOCUMENTS

| | | | |
|---|---|---|---|
| 4,662,746 A | 5/1987 | Hornbeck | 359/223 |
| 4,674,828 A | 6/1987 | Takahashi et al. | 385/18 |
| 4,693,544 A * | 9/1987 | Yamasaki et al. | 385/47 |
| 4,705,349 A | 11/1987 | Reedy | 385/18 |
| 4,710,732 A | 12/1987 | Hornbeck | 359/291 |
| 4,715,680 A | 12/1987 | Kawaguchi et al. | 385/18 |
| 4,718,056 A | 1/1988 | Schultheiss | 398/88 |
| 4,753,513 A | 6/1988 | Shikama | 359/566 |
| 4,755,415 A | 7/1988 | Iijima et al. | 428/163 |
| 4,764,889 A | 8/1988 | Hinton et al. | 364/807 |
| 4,815,827 A | 3/1989 | Lane | 385/18 |
| 4,867,532 A | 9/1989 | Stanley | 359/572 |
| 4,904,039 A | 2/1990 | Soref | 385/2 |
| 5,024,500 A | 6/1991 | Stanley et al. | 385/16 |
| 5,029,981 A | 7/1991 | Thompson | 385/37 |
| 5,036,042 A | 7/1991 | Hed | 505/1 |
| 5,040,864 A | 8/1991 | Hong | 385/16 |
| 5,063,418 A | 11/1991 | Shurtz, II et al. | 357/15 |
| 5,083,857 A | 1/1992 | Hornbeck | 359/291 |
| 5,107,359 A | 4/1992 | Ohuchida | 398/79 |
| 5,133,027 A | 7/1992 | Funazaki et al. | 385/5 |
| 5,153,770 A | 10/1992 | Harris | 359/245 |
| 5,155,617 A | 10/1992 | Solgaard et al. | 359/245 |
| 5,155,778 A | 10/1992 | Magel et al. | 385/18 |
| 5,157,756 A | 10/1992 | Nishimoto | 385/129 |
| 5,221,987 A | 6/1993 | Laughlin | 359/222 |
| 5,231,304 A | 7/1993 | Solomon | 257/684 |
| 5,255,332 A | 10/1993 | Welch et al. | 385/17 |
| 5,262,000 A | 11/1993 | Welbourn et al. | 156/643 |
| 5,278,925 A | 1/1994 | Boysel et al. | 385/14 |
| 5,291,566 A | 3/1994 | Harris | 385/8 |
| 5,311,360 A | 5/1994 | Bloom et al. | 359/872 |
| 5,315,676 A | 5/1994 | Sunagawa | 385/37 |
| 5,331,658 A | 7/1994 | Shieh et al. | 372/50 |
| 5,377,288 A | 12/1994 | Kashyap et al. | 385/37 |
| 5,455,709 A | 10/1995 | Dula, III et al. | 359/245 |
| 5,491,762 A | 2/1996 | Deacon et al. | 385/16 |
| 5,500,910 A | 3/1996 | Boudreau et al. | 385/24 |
| 5,532,855 A | 7/1996 | Kato et al. | 359/117 |
| 5,537,617 A | 7/1996 | Zavislan et al. | 385/37 |
| 5,561,558 A | 10/1996 | Shiono et al. | 359/569 |
| 5,661,592 A | 8/1997 | Bornstein et al. | 359/291 |
| 5,661,593 A | 8/1997 | Engle | 359/292 |
| 5,682,255 A | 10/1997 | Friesem et al. | 359/15 |
| 5,748,811 A | 5/1998 | Amersfoort et al. | 385/15 |
| 5,770,855 A | 6/1998 | Fischer | 250/216 |
| 5,771,320 A | 6/1998 | Stone | 385/16 |
| 5,771,321 A | 6/1998 | Stern | 385/31 |
| 5,786,925 A | 7/1998 | Goossen et al. | 359/245 |
| 5,875,271 A | 2/1999 | Laughlin | 385/16 |
| 5,892,598 A | 4/1999 | Asakawa et al. | 359/13 |
| 5,960,133 A | 9/1999 | Tomlinson | 385/18 |
| 5,966,223 A | 10/1999 | Friesem et al. | 359/16 |
| 6,072,923 A | 6/2000 | Stone | 385/16 |
| 6,072,925 A | 6/2000 | Sakata | 385/24 |
| 6,093,941 A | 7/2000 | Russell et al. | 257/103 |
| 6,169,613 B1 | 1/2001 | Amitai et al. | 359/15 |
| 6,195,478 B1 * | 2/2001 | Fouquet | 385/17 |
| 6,212,314 B1 | 4/2001 | Ford | 385/30 |
| 6,288,829 B1 | 9/2001 | Kimura | 359/291 |
| 6,389,189 B1 * | 5/2002 | Edwards et al. | 385/16 |
| 6,433,911 B1 * | 8/2002 | Chen et al. | 359/222 |
| 6,493,482 B1 * | 12/2002 | Al-hemyari et al. | 385/19 |
| 6,501,869 B1 * | 12/2002 | Athale | 385/18 |
| 6,618,519 B2 * | 9/2003 | Chang et al. | 385/18 |
| 6,631,222 B1 * | 10/2003 | Wagener et al. | 385/16 |
| 6,810,176 B2 | 10/2004 | Frick et al. | |
| 2001/0048265 A1 | 12/2001 | Miller et al. | |
| 2002/0159683 A1 * | 10/2002 | Helin et al. | 385/18 |
| 2003/0012483 A1 * | 1/2003 | Ticknor et al. | 385/16 |

FOREIGN PATENT DOCUMENTS

| | | |
|---|---|---|
| EP | 0137851 | 4/1985 |
| EP | 0277779 | 10/1988 |
| EP | 0 322 218 | 6/1989 |
| EP | 0 467 303 | 1/1992 |
| EP | 0279679 | 11/1992 |
| EP | 0 609 812 | 8/1994 |
| EP | 0 969 306 | 1/2000 |
| GB | 2189038 A | 10/1987 |
| JP | 57-35828 | 2/1982 |
| JP | 57-173814 | 10/1982 |
| JP | 57-173819 | 10/1982 |
| JP | 57-173820 | 10/1982 |
| JP | 59-147322 | 8/1984 |
| JP | 59-176731 | 10/1984 |
| JP | 59-185311 | 10/1984 |
| JP | 59-214020 | 12/1984 |
| JP | 60-22120 | 2/1985 |
| JP | 60-97319 | 5/1985 |
| JP | 60-134219 | 7/1985 |
| JP | 60-190038 | 9/1985 |
| JP | 61-121042 | 6/1986 |
| JP | 61-231522 | 10/1986 |
| JP | 62-49336 | 3/1987 |
| JP | 62-69247 | 3/1987 |
| JP | 62146443 | 6/1987 |
| JP | 4-30130 | 2/1992 |
| JP | 4-287028 | 10/1992 |
| JP | 5-93924 | 4/1993 |
| JP | 5-142587 | 6/1993 |
| JP | 6-95173 | 4/1994 |
| JP | 8-234246 | 9/1996 |
| JP | 10-206910 | 8/1998 |
| JP | 2000-105321 | 4/2000 |
| JP | 2000-221553 | 8/2000 |
| WO | WO 95/13638 | 5/1995 |
| WO | WO 00/02098 | 1/2000 |
| WO | WO 00/79311 | 12/2000 |
| WO | WO 01/42825 | 6/2001 |

OTHER PUBLICATIONS

International Search Report from PCT/US03/06658.

Xing, et al. "Contra-directional coupling betwee n stacked waveguides using grating couplers," *Optics Communications* 144: 180-182 (1997).

Chan, "Compact Disc Pickup Designs" Jul. 18, 2000.

Jahns, et al. "Planar Integration of Free-Space Optical Components," *Applied Optics* 28(9):1602-1605 (1989).

Krygowski et al. "Development of a Co mpact Optical-MEMS Scanner with Integrated VCSEL Light Source and Diffractive Optics," *SPIE* 3878:20-28 (1999).

Krygowski et al. "Integrated Microsystems" *Proc. Of SPIE* 3878:20-28 (1999).

Wendt, et al. "Fabricati on of diffractive optical elements for an integrated compact optical microelectromechanical system laser scanner," *J. Vac. Sci. Technol.* 18(6):3608-3611 (2000).

Völkel, et al. "Optical backplane for a broadband switching system," *Electronics Letters* 31(3):234-235 (1995).

Tabib-Azar, et al. "Fiber-optics MEMS pressure sensors based on evanescent field interaction," *SPIE* 3276:135-146.

Tabib-Azar, et al. "MOEM Pressure and Other Physical Sensors Using Photon Tunneling and Optical Evanescent Fields with Exponential Sensitivities and Excellent Stabilities," *Conf. on Microelectronic Structures and MEMS for Optical Processing* 3513:210-222 (1998).

* cited by examiner

OPTICAL SWITCH WITH 3D WAVEGUIDES

CROSS-REFERENCE TO RELATED APPLICATION

This application claims the benefit of U.S. Provisional Application No. 60/360,946 filed on Mar. 1, 2002.

FIELD OF THE INVENTION

The present invention relates generally to optical elements and more specifically to optical gratings and diffractive optical elements used to perform optical switching functions.

BACKGROUND OF THE RELATED ART

Optical switches are needed for routing signals in optical fiber communication systems. Two basic operating principles are used in known devices. These principles are free space optics and planar waveguides.

Free space switches use collimators to generate optical beams traveling in free space. These optical beams can be routed by moveable mirrors and other similar devices to receiving collimators positioned on the desired output fibers. It is known that small optical beams will diverge as they travel, due to diffraction. This divergence causes large losses in devices that have practical sizes. In addition, practical limits on the flatness of the moveable mirrors cause additional divergence and further losses. Further still, collimators are large, expensive and very difficult to align, all factors that cause free-space switches to be expensive to manufacture.

Planar optical waveguides have been used to eliminate the beam divergence inherent in the free space devices described above. Planar optical waveguides can also eliminate the need for input and output collimators, resulting in a more compact structure with lower manufacturing costs. Waveguides of various known configurations are formed on the surface of a substrate. Various switching mechanisms are used to route the signals at the intersections of these surface waveguides. The 2-dimensional nature of these devices generally requires an air gap at these intersections so that a switching mechanism can be inserted. Moveable mirrors and bubbles in optical index matching coupling fluid have been used to create this switching mechanism.

Known devices have large losses at these intersection due to the presence of the air gap. An N×N switch will have 2N such intersections. These losses become unacceptable as N becomes large. In addition, planar waveguides do not have light beam profiles that match those of an optical fiber. This causes substantial coupling losses at the input and output stages where fiber coupling is to occur.

Previous patent applications by this inventor (U.S. application Ser. No. 09/905,736 entitled "Optical Switch with Moveable Holographic Optical Element" and Ser. No. 09/905,769 entitled "Integrated Transparent Substrate and Diffractive Optical Element," each expressly incorporated herein by reference) show a switch that combines the advantages of free space and waveguide devices. The approaches shown are generally illustrated in FIGS. 1 and 2. These applications show a switch that is based on routing of optical signals via total internal reflection (TIR) in a transparent substrate. The configurations reduce beam divergence because of the higher index of refraction in the substrate as compared to free-space. These configurations also minimize alignment and positioning problems since all of the components are rigidly and precisely located by the substrate. The devices eliminate the air gaps that are required in known planar waveguide based switches, since total internal reflection is used to route the signals. Total internal reflection is known to have very little loss, and this mechanism eliminates the loss problem inherent in such waveguide switches.

In operation, a diffraction grating 100 is disposed adjacent an optical substrate 102 having an incident light beam 104 traveling within the substrate 102 under total internal reflection (TIR), which occurs above a critical incidence angle. The diffraction grating 100 is moveable relative to the substrate 102 to selectively introduce the diffraction grating 100 into the evanescent field generated at a upper surface 106 of the substrate 102 where TIR occurs. The diffraction grating 100 illustrated in FIGS. 1 and 2 is formed from parallel strips 108. FIG. 1 shows the diffraction grating 100 in a first, switching position, where the input signal 104 is switched into an output beam 110. FIG. 2 shows a second, non-switching position, where the diffraction grating 100 does not affect the input wave 104, which continues to propagate via TIR as an output beam 112. The deflection of the beam 104 into light beam 110 represents beam switching, while the reflection into light beam 112 represents un-affected propagation.

The diffraction grating 100 is typically designed to have a single diffraction mode, the −1 diffraction mode, which results in maximum power being directed in a desired direction, i.e., light beam 110 or 112. This minimizes loss in switching position, as compared to the virtually loss-free non-switching position. The thickness of the grating strips 108 may be adjusted so that the light reflected from the diffraction grating 100 is in phase with the light reflected at the surface 106 in the desired direction. This results in constructive interference and the diffraction grating 100 can have an overall efficiency of approximately 90%.

In spite of these advantages, generally devices like those of FIGS. 1 and 2 may still require collimators to minimize beam spreading. In addition, the relatively long path between grating and output fibers may introduce wavelength dependent loss (WDL). This is undesirable in telecommunications systems and should be minimized. The WDL is due to grating dispersion, where different wavelengths propagate in slightly different directions. This effect could limit the practical N value for an N×N switch using these approaches.

SUMMARY OF THE INVENTION

In accordance with an example, provided is an optical switch having a substrate; a first buried optical waveguide for propagating an optical signal, where said optical signal propagates in the first optical waveguide along a first direction; and a second buried optical waveguide extending in a second direction different than the first direction. The switch further includes a diffractive optical element disposed above a total internal reflection region of the substrate and moveable relative thereto between a switching position wherein the optical signal is switched from the first optical waveguide into the second optical waveguide and a non-switching position wherein the optical signal reflects at the total internal reflection region under total internal reflection.

In accordance with another example, an optical switch includes a substrate having a plurality of intersection regions; a buried input waveguide within the substrate for propagating an optical signal under total internal reflection; and a plurality of buried output waveguides within the substrate for propagating the optical signal, wherein each of the plurality of buried output waveguides is disposed adjacent the buried input waveguide at one of the plurality of intersection regions. The switch further includes a plurality of diffractive optical elements, each diffractive optical element disposed above one of the plurality of intersection regions, and each diffractive optical element individually moveable relative to the substrate between a non-switching position and a switching position where the optical signal propagating in the buried input waveguide is coupled into one of the plurality of buried output waveguides.

In accordance with yet another example, provided is a method of switching an optical signal comprising forming a buried input waveguide in a substrate, the buried input waveguide extending in a first direction; forming a buried output waveguide in the substrate, the buried output waveguide extending in a second direction different from the first direction; and disposing a diffractive optical element adjacent the substrate for movement between a switching position, wherein the optical signal propagating in the buried input waveguide is coupled into the buried output waveguide, and a non-switching position wherein the optical signal propagating in the buried input waveguide is not coupled into the buried output waveguide.

DESCRIPTION OF EXAMPLE EMBODIMENTS

Figure 1:
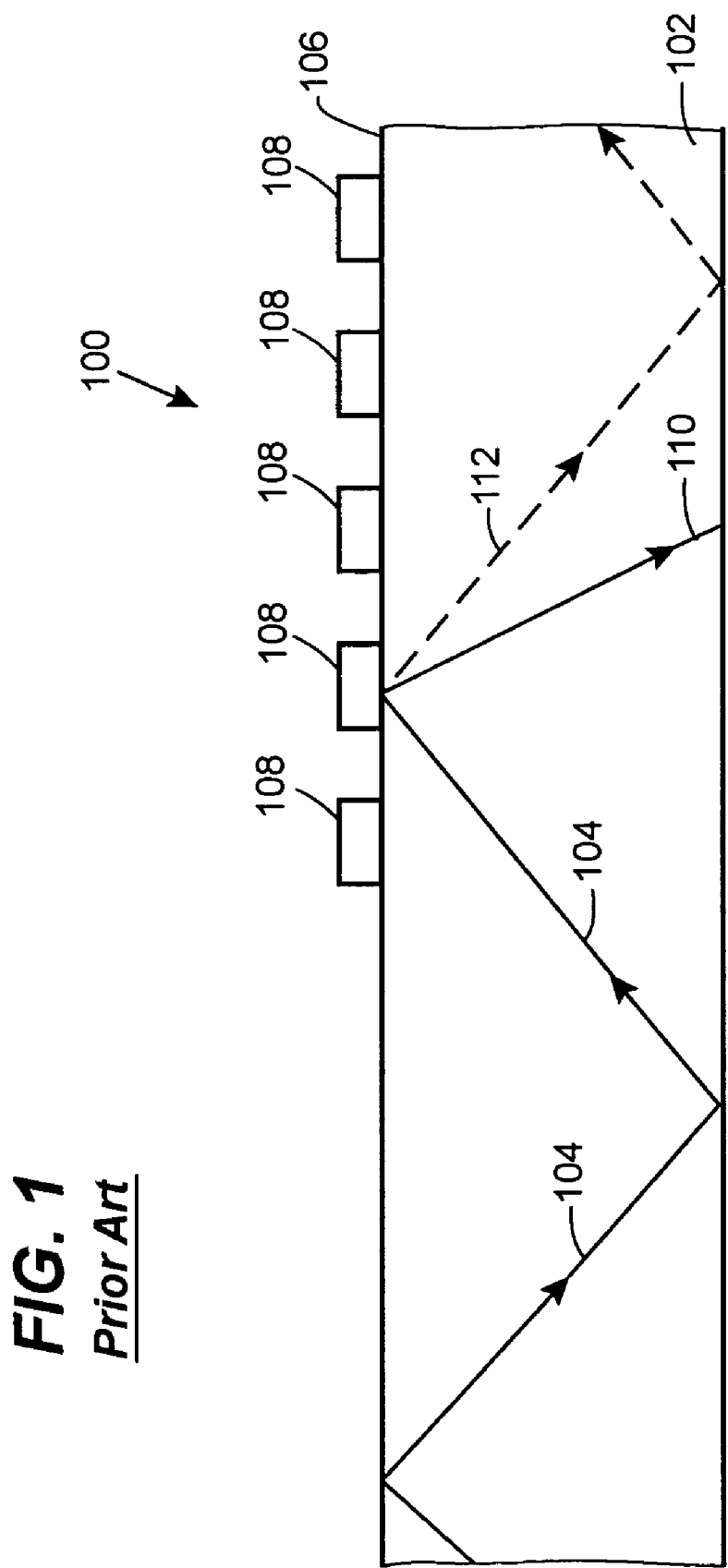
FIG. 1 is a cross-sectional view of a diffraction grating in a switching position.
Figure 2:
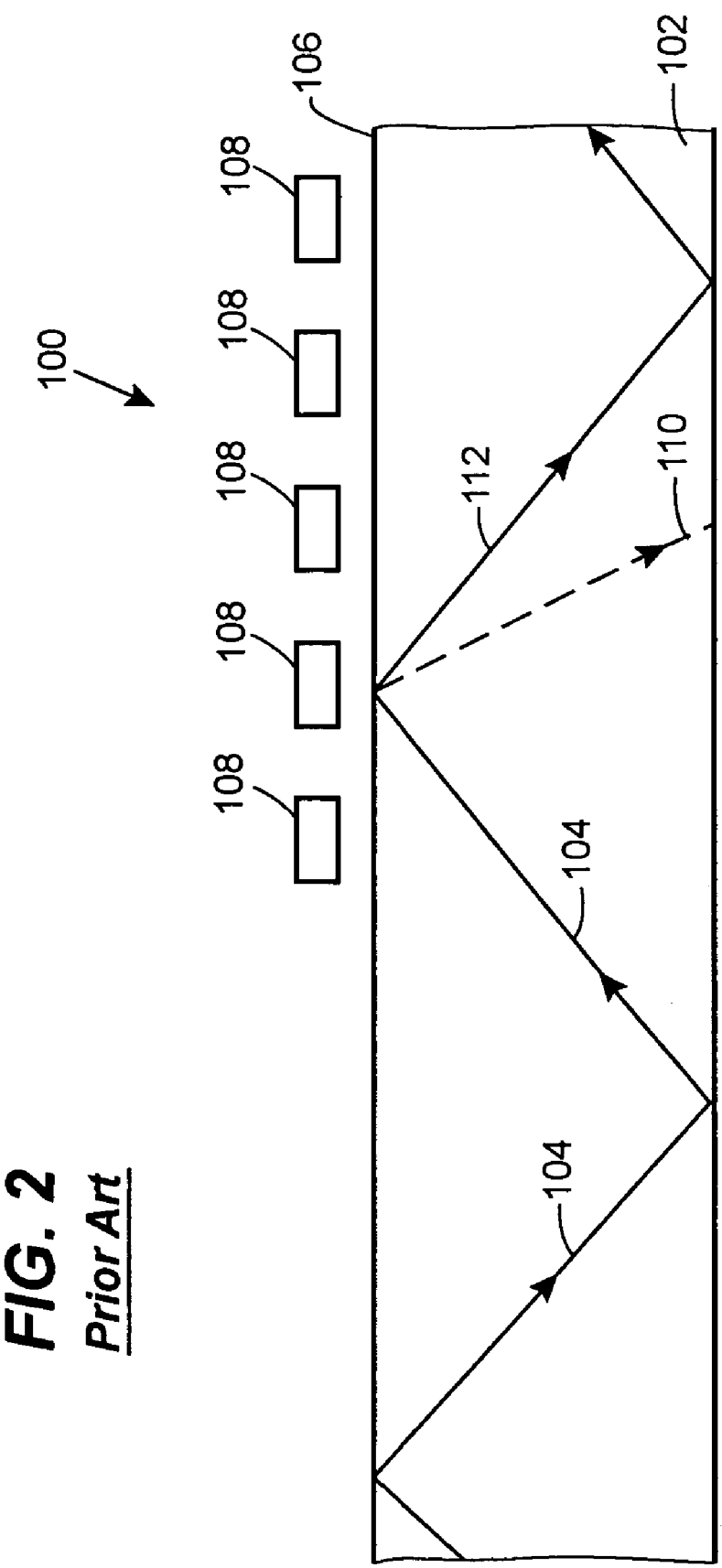
FIG. 2 is a cross-sectional view of the diffraction grating of FIG. 1 in a non-switching position.
Figure 3:
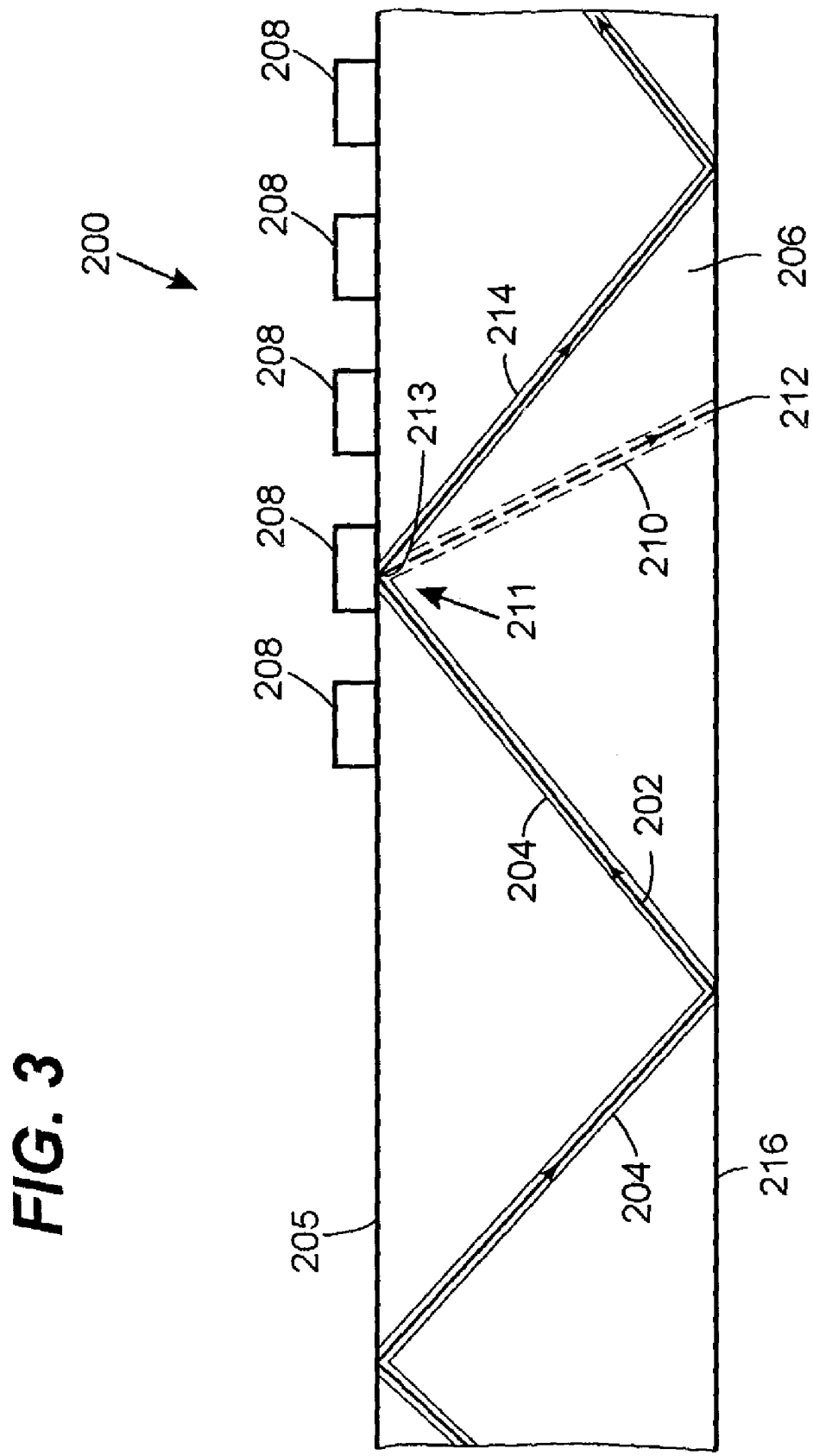
FIG. 3 is a cross-sectional view of a diffraction grating positioned adjacent an optical substrate having waveguides, in accordance with an embodiment.

This application shows an improvement on the devices illustrated in FIGS. 1 and 2. Operation of the improved device is shown in FIG. 3. In general, waveguides buried in an optical substrate are used to eliminate beam divergence and related losses. These buried waveguides extend into the bulk of a substrate and, thus, have an extent parallel to a top surface of the substrate and another extent perpendicular to that surface. These waveguides terminate at or in close proximity to a total internal reflection region, where total internal reflecting may occur. Such termination minimizes WDL since the waveguide will capture light over a wide range of angles if it is close to the top surface. Such termination also maintains very low losses at waveguide intersections where an input waveguide and an output waveguide could meet, because the distance over which an optical beam is unguided is kept to a minimum. As a result, the guided beams in the improved device can have a much smaller diameter than the unguided waves in FIGS. 1 and 2. A typical beam diameter in prior art devices, such as that shown in FIGS. 1 and 2, may be approximately 200 µm. A typical beam diameter described herein may be an order of magnitude smaller, e.g., approximately 10 microns. This reduces the overall size and cost of the device. It also substantially reduces the WDL loss of the device and makes it insensitive to the "size" of the switch (N).

A switching position of an optical switch 200 is shown in FIG. 3. A light beam 202 is guided by an input waveguide 204 to a surface 205 of a substrate 206. The light beam 202 is incident at an angle, measured from the normal to the surface 205, that exceeds the critical angle for TIR. This angle is typically 45 degrees since the substrate 206 and the waveguide 204 are preferably constructed of fused silica with a critical angle of about 43 degrees. In the switching position shown a diffractive optical element in the form of a diffraction grating 208 is brought within the TIR evanescent field by reducing the distance between the diffraction grating 208 and the substrate 206. This distance between the two in the switching position shown in FIG. 3 would typically be about 0.1 µm. In an embodiment, the diffraction grating 208 has the same index of refraction as the substrate 206 and the waveguide 204. The grating 208, as with the gratings described in the below examples, is a diffraction optical element.

The grating 208 diffracts the light beam 202 such that it is captured by an output waveguide 210, also within the substrate 206. The output waveguide 210 is in a plane extending out of the paper and thus is shown in phantom. The deflected light beam is light beam 212. In the illustrated example, the two waveguides 204 and 210 intersect at an intersection region 211 of the substrate 206. The distance between a point of intersection between the waveguides 204 and 210 and the top surface 205 is typically less than 10 µm. Switching of an optical signal in the waveguide 204 into the waveguide 210 occurs at the intersection region 211.

The diffraction grating 208 is preferably constructed of fused silica, and the grating period is adjusted to provide only one diffracted mode in the desired direction of diffraction. This period may be approximately 2 µm in some embodiments. The grating thickness is the minimum thickness consistent with maximum efficiency and other performance parameters and is typically about 0.6 µm. Although thicker gratings can also have high efficiency, they tend to be very sensitive to small variations in dimensions and properties because they tend to introduce resonance into the optical path. Preferably, the grating 208 has a period that is substantially equal to the wavelength of light of an optical signal propagating in the waveguide 204.

Figure 4:
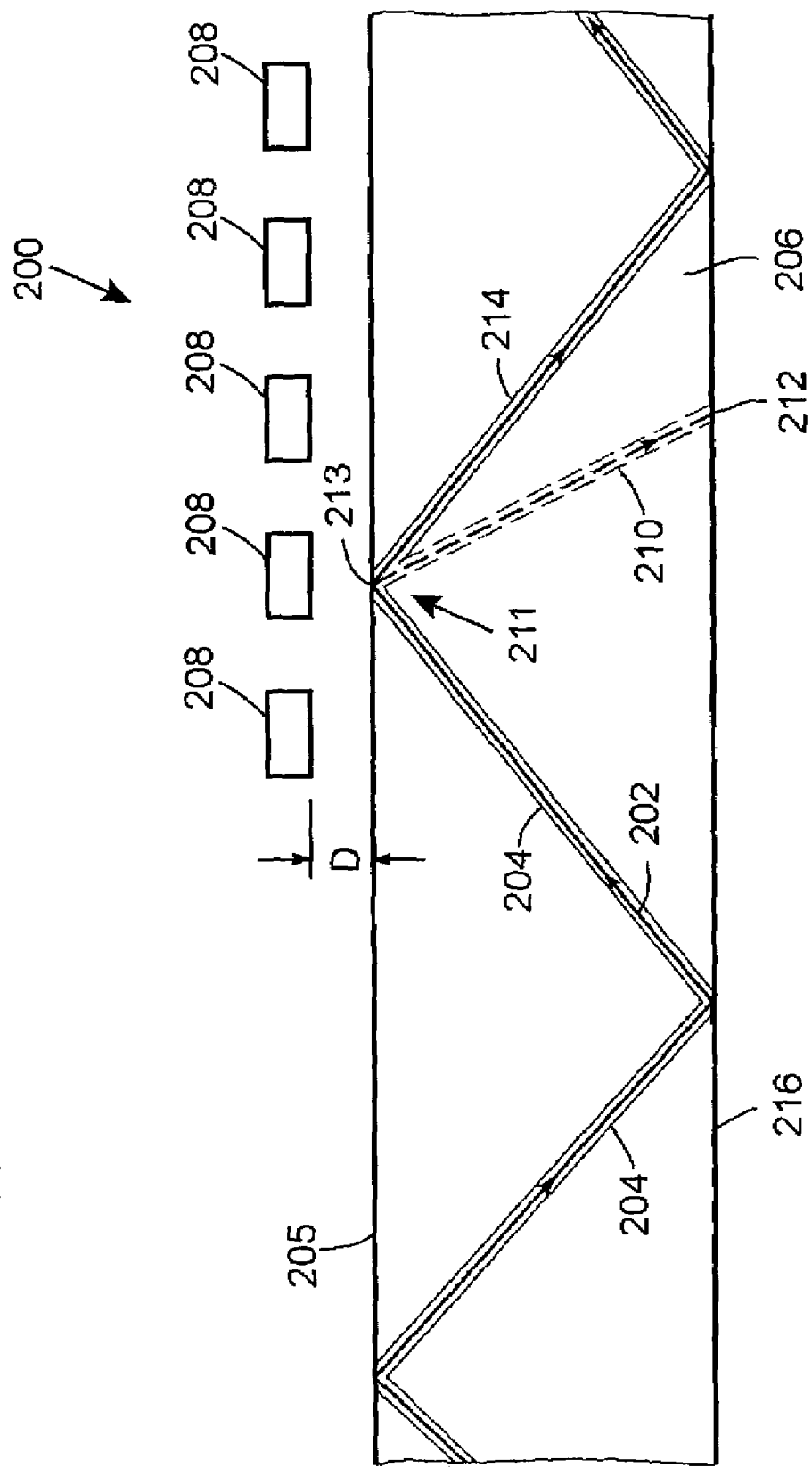
FIG. 4 is a cross-sectional view of the diffraction grating of FIG. 3 disposed in a second position with respect to the optical substrate, in accordance with an embodiment.

The non-switching, or off, position is shown in FIG. 4, in which the grating 208 is pulled away from the top surface 205 by distance, D. This distance, D, is typically 10 to 20 µm. In the illustrated position, the light beam 202 is reflected by TIR at a total internal reflection region 213 and is captured by a second, output waveguide 214, propagating as light beam 216. The output waveguides 210 and 214 are coupled directly to the input waveguide 204, but instead may be disposed adjacent to but not directly contacting the input waveguide 204. Further, the output waveguide 214 may be a separate waveguide or a continuation of the input waveguide 204.

In an embodiment, the waveguides 204, 210, and 214 are buried waveguides, each allowing for a signal to propagate under TIR off of the top surface 205 and a bottom surface 216.

Figure 5:
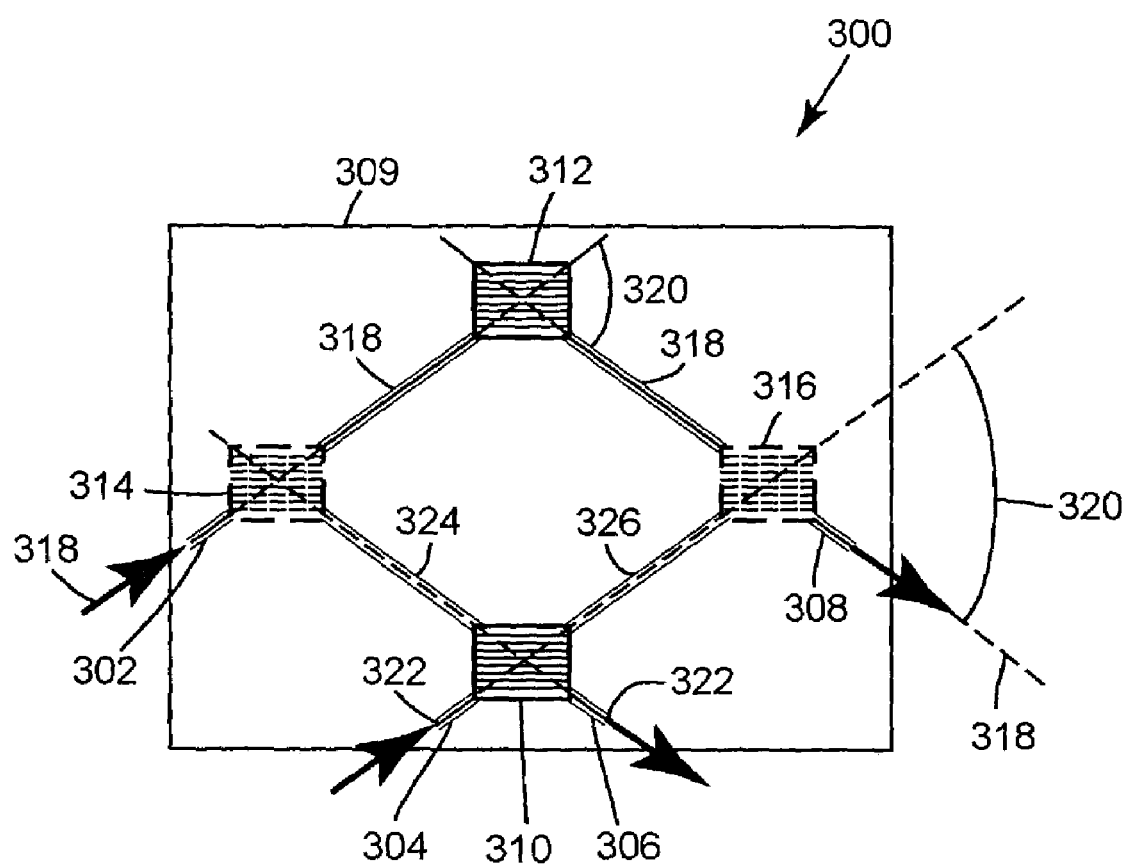
FIG. 5 is a top view of an example 2×2 section of an N×N optical switch.

FIG. 5 illustrates a top view of a 2×2 section 300 of an N×N optical switch, in an example, switching configuration. Two input waveguides 302 and 304 are coupled to two output waveguides 306 and 308, all formed within a substrate 309. Diffraction gratings 310 and 312 are disposed on the substrate 309 over intersection regions and are in the "on" or switching position. Diffraction gratings 314 and 316 are disposed on the substrate 309 over intersection regions and are in the "off" or non-switching position. An optical signal propagating along input waveguide 302 is coupled to output waveguide 308 by a light path 318. The light path 318 is unaffected by the diffraction grating 314, in the non-switching position. The light path 318 continues under TIR off the top and bottom surfaces of the substrate 309 to the grating 312. The grating 312 diffracts the light path 318 an angle 320, and the light path 318 continues by TIR past the grating 316 (in the non-switching position) to the output waveguide 308.

The signal propagating to the input waveguide 304 is coupled to the output waveguide 306 by a light path 322. The light path 322 encounters the grating 310, in the "on" position," and diffracts the light path 322 at the angle 320, so that the optical signal couples to the output waveguide 306. The angle 320 is preferably about 68 degrees. In the illustrated switch configuration, no light propagates in waveguides 324 and 326.

Figure 6:
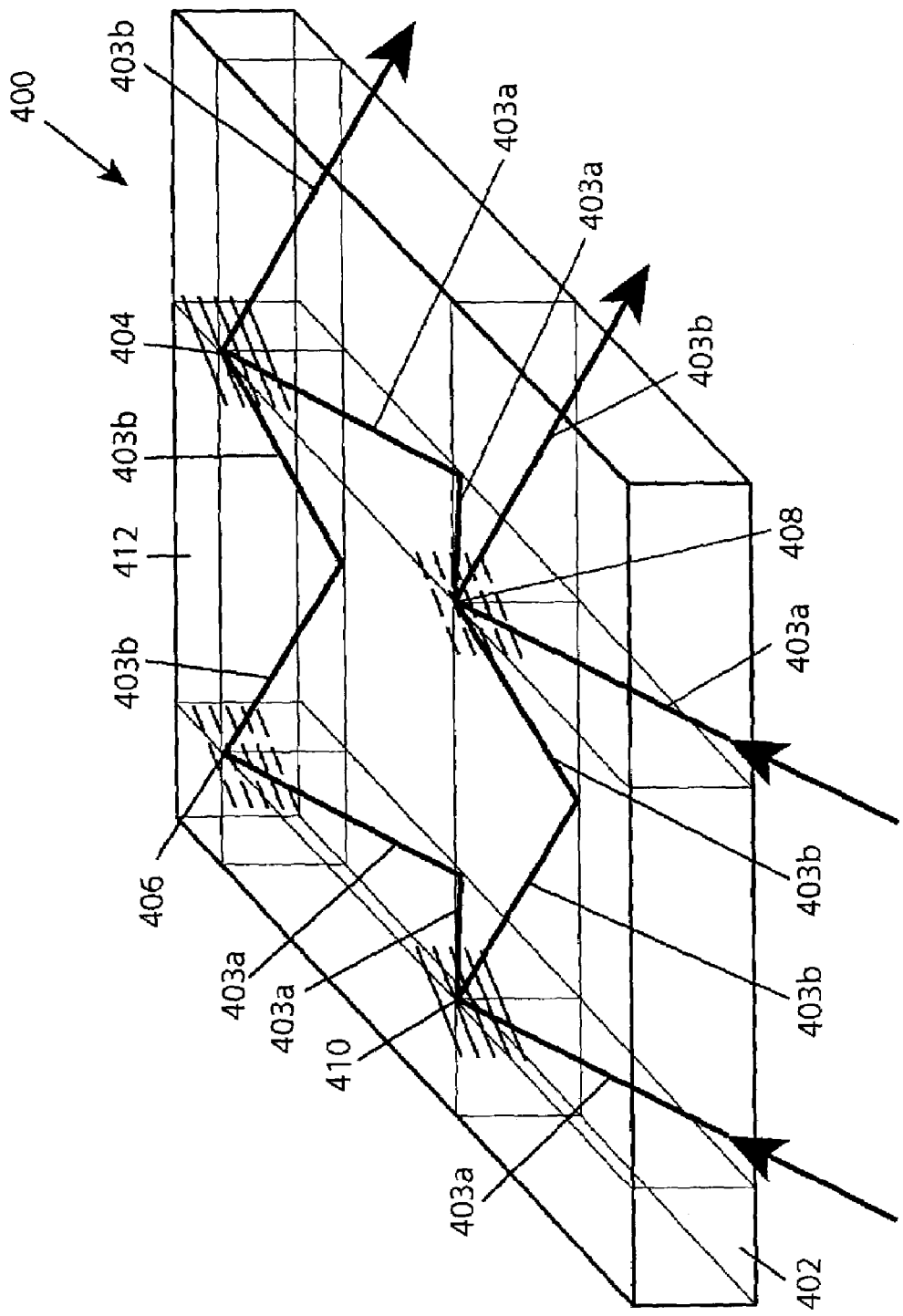
FIG. 6 illustrates a perspective view of a 2×2 switch in accordance with an embodiment.

FIG. 6 shows a 3-dimensional representation of a 2×2 switch 400, in a particular switch configuration. Waveguides 403 (input waveguides 403a and output waveguides 403b) are buried waveguides formed in a substrate 402. Generally, these waveguides, 403, as well as the other waveguides described herein, may be written into the substrate 402 by known techniques, such as those described by D. Homoelle et al., "Infrared photosensitivity in silica glasses exposed to femtosecond laser pulses," Optics Letters, Vol. 24, No.18, Sep. 15, 1999.

In brief, an infrared pulsed laser may be focused to a spot, in the substrate 402, which heats to a point such that the refractive index at the point is permanently increased. The substrate 402 is moved with a 3-dimensional positioning system to generate the desired waveguide pattern. Parameters are adjusted to produce a single-mode waveguide for the desired operating wavelength, which is typically 1550 nm. The waveguides formed are preferably 8 μm in diameter with an increased index of refraction of about 3.5%. This produces a guided beam of about 10 μm in diameter that matches that of a typical optical fiber. Parameters can be adjusted to produce larger diameter beams if so desired. As will become apparent, up to 4 waveguides may converge at a point in the substrate 402. The waveguides may extend all the way to the surface of the substrate 402 or they may terminate at a point a few microns below the surface. The position and termination point of the waveguides is adjusted for maximum performance.

Figure 9:
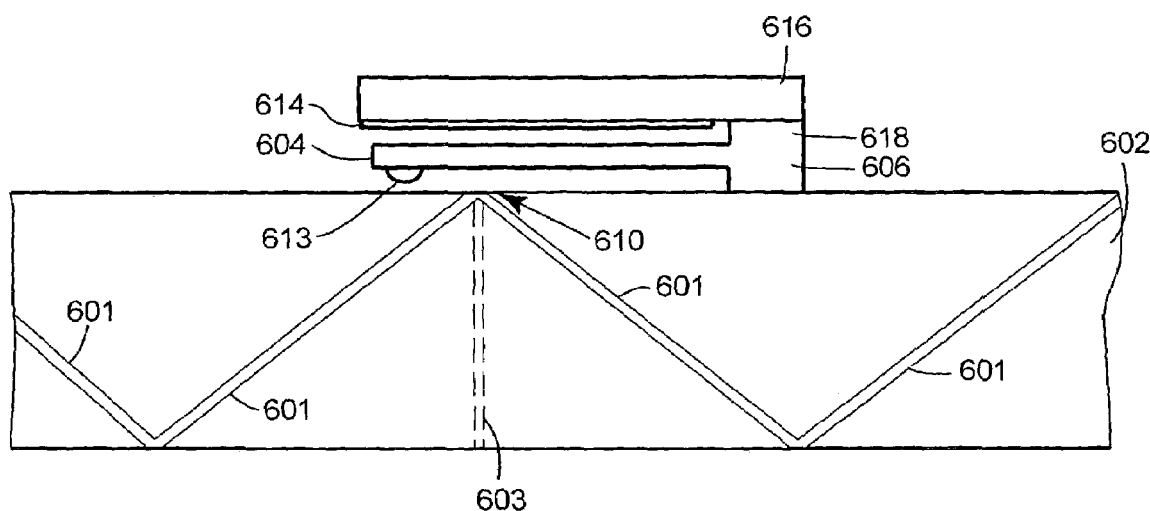
FIG. 9 is a top view of the diffraction grating of FIG. 8 showing an electrode disposed above the diffraction grating for moving the diffraction grating relative to the top surface of the substrate, in accordance with an example.
Figure 10:
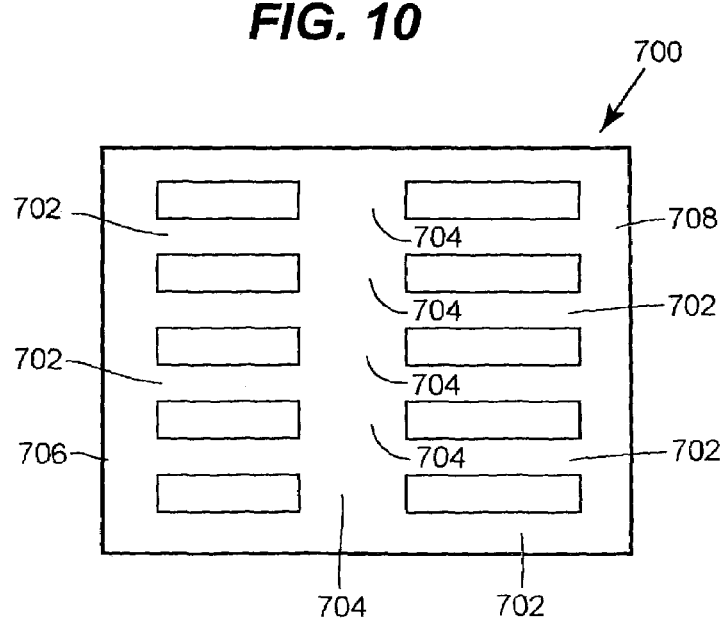
FIG. 10 is an exemplary partial top view of another diffraction grating in accordance with an embodiment.
Figure 11:
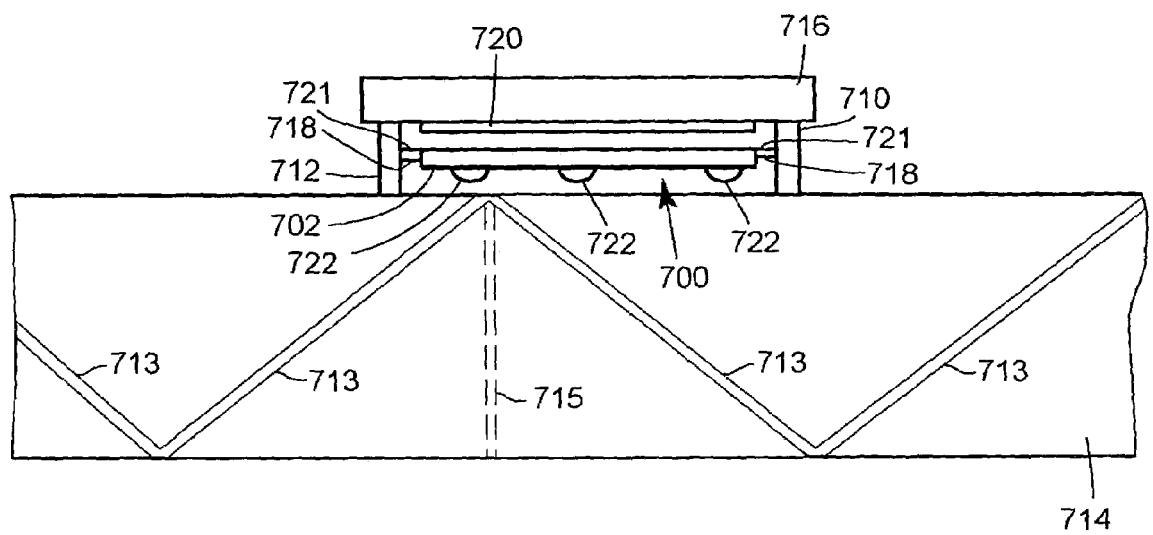
FIG. 11 is a side view of the diffraction grating shown in FIG. 10 further showing a mounting structure and an electrode disposed above the diffraction grating.
Figure 12:
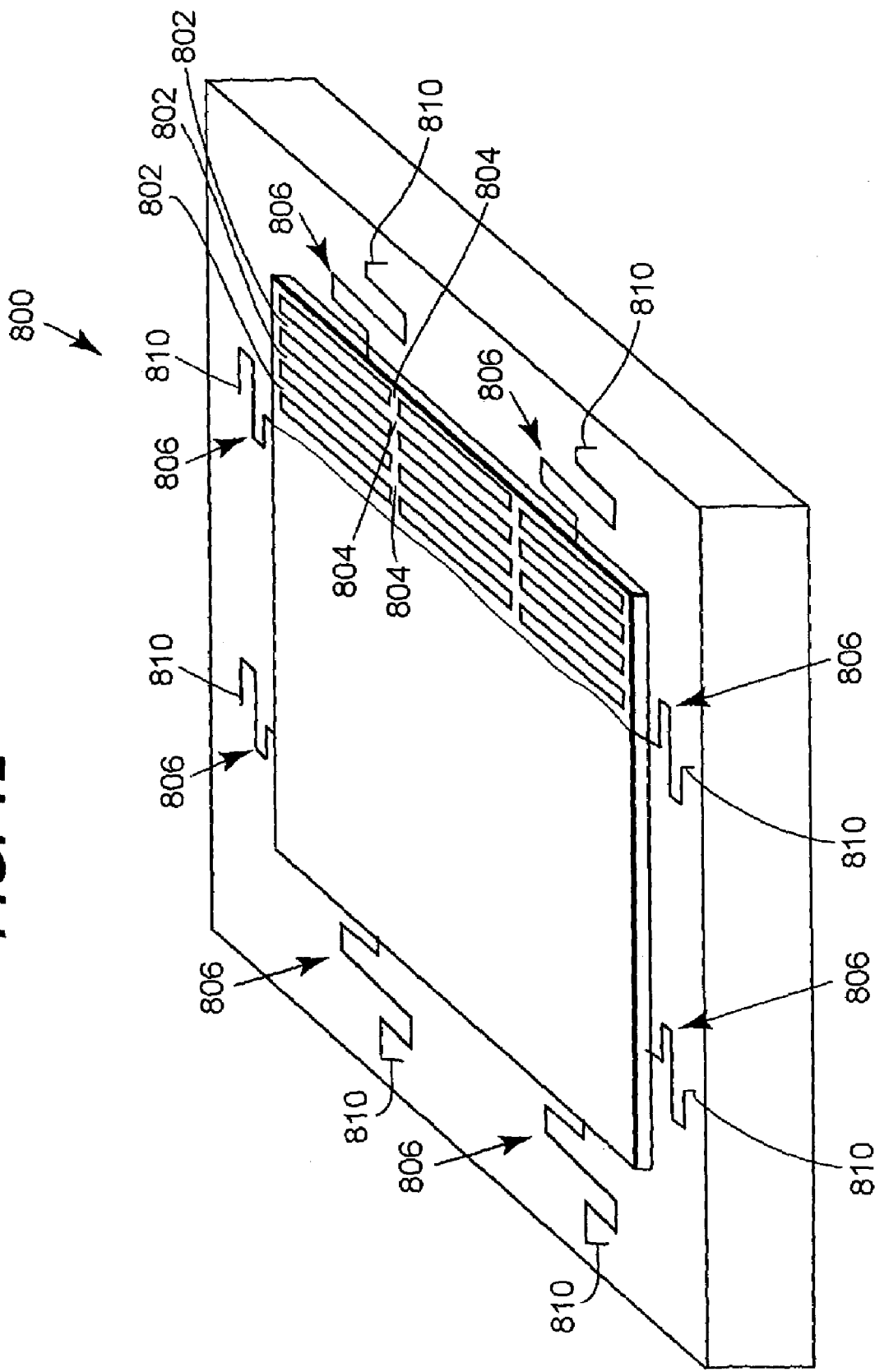
FIG. 12 is a perspective view of a diffraction grating having an actuation member formed of flexible arms and mounting feet in accordance with an embodiment.

Moveable diffraction gratings 404, 406, 408 and 410, which each need only be slightly larger than the beam diameter, would be typically 20 μm in diameter, if circular in shape, or about 20 μm across each side, if square in shape. These structures are disposed adjacent intersection regions in the substrate 402. The thickness of the substrate 402 would preferably be about 200 μm thick, and the diffraction gratings 404–410 would be spaced about 400 μm apart from one another on a top surface 412 of the substrate 402. In one embodiment, the gratings 404–410 would be mounted on a fused silica cantilever that is attached to the substrate 402, similar to the embodiment illustrated in FIGS. 8 and 9. The gratings 404–410 may have other forms, and FIGS. 10–12 provide additional examples. Each of the gratings 404–410 would be actuated individually and electrostatically via a deposited metal film on the surface of the cantilever and an electrode spaced above the surface 412.

Preferably, an optical absorption coating is applied on unused portions of the top surface 412 between the total internal reflection regions where TIR may occur and where the gratings 404–410 are positioned. Such absorption coatings will absorb stray light that escapes from these total internal reflection regions and will prevent undesirable cross talk. Additionally, the device 400 could be modified to collect and dissipate any light that is not diffracted by any grating. This light is known as the zero-order mode light. Preferably, each of the waveguides 403 is a buried waveguide that would also extend into a side or bottom face of the substrate 402 and couple any energy out of the substrate 402. As illustrated, the input waveguides 403a are in a first plane and the output waveguides 403b are in a second plane forming an angle with the first plane.

Figure 7:
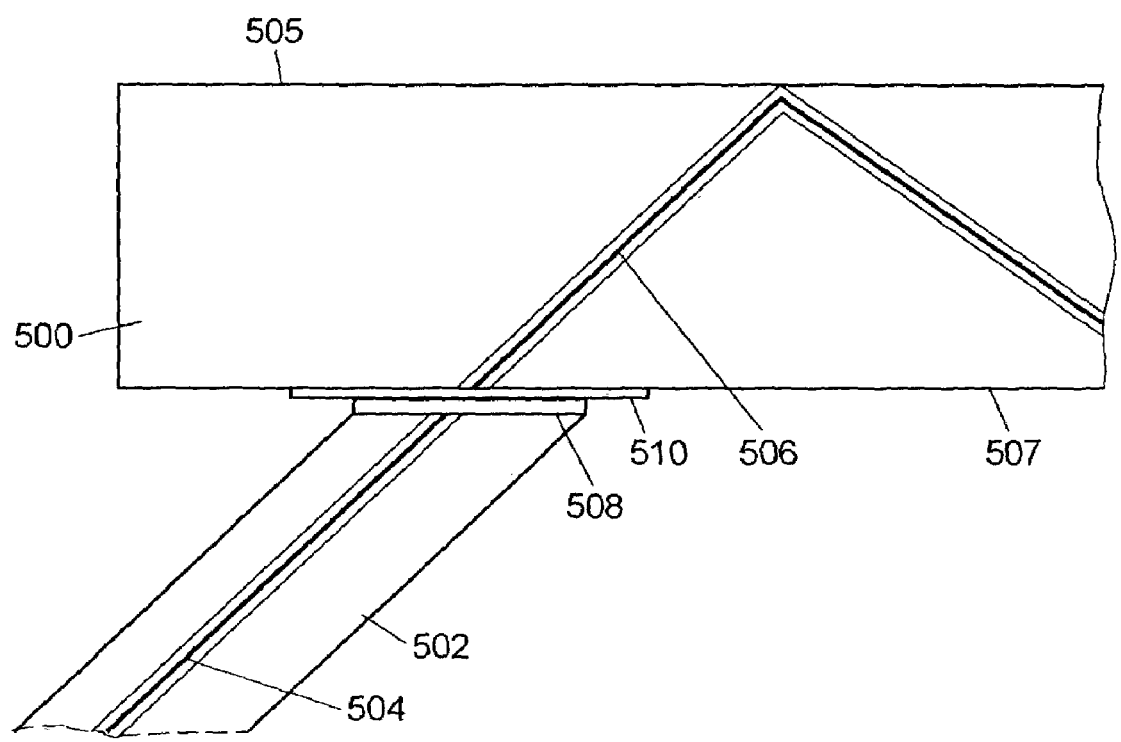
FIG. 7 illustrates a cross-sectional view of an example coupling between a single-mode fiber and a waveguide in a substrate.

FIG. 7 shows a typical connection between a substrate 500 and a single-mode optical fiber 502. The fiber 502 has a core 504 that is aligned with a buried waveguide 506 extending into the substrate 500. The waveguide 506 may be like any of the waveguides described above, and thus is capable of propagating a signal under TIR off of a top surface 505 and a bottom surface 507 of the substrate 500. In the illustrated example, the fiber 502 is polished at a 45-degree angle and is coated with an anti-reflection coating 508 to reduce Fresnel reflection losses and prevent undesirable back-reflected energy from entering the fiber 502. The substrate 500 may also have a similar coating 510. The fiber 502 may be held in place with an alignment fixture or potting material, for example.

Other materials and constructions may be used, and various actuation and suspension means for the diffraction gratings could be employed. Further, the gratings or actuating structure may have "bumps" on surfaces facing the substrate to prevent intimate contact between the substrate and the grating in the switching position, thus minimize sticking. Devices other than diffraction gratings may be used to switch the beam direction, as well. Miniature prisms or Fresnel type mirrors may be evanescently coupled to the TIR field extending above a substrate having the buried waveguides. Further still, the waveguides could be curved to eliminate the TIR bounces at the bottom surface, if desired. The substrate thickness would have to be consistent with a radius of curvature in the waveguide that had relatively low loss. Other alternatives will be known to persons of ordinary skill in the art.

Figure 8:
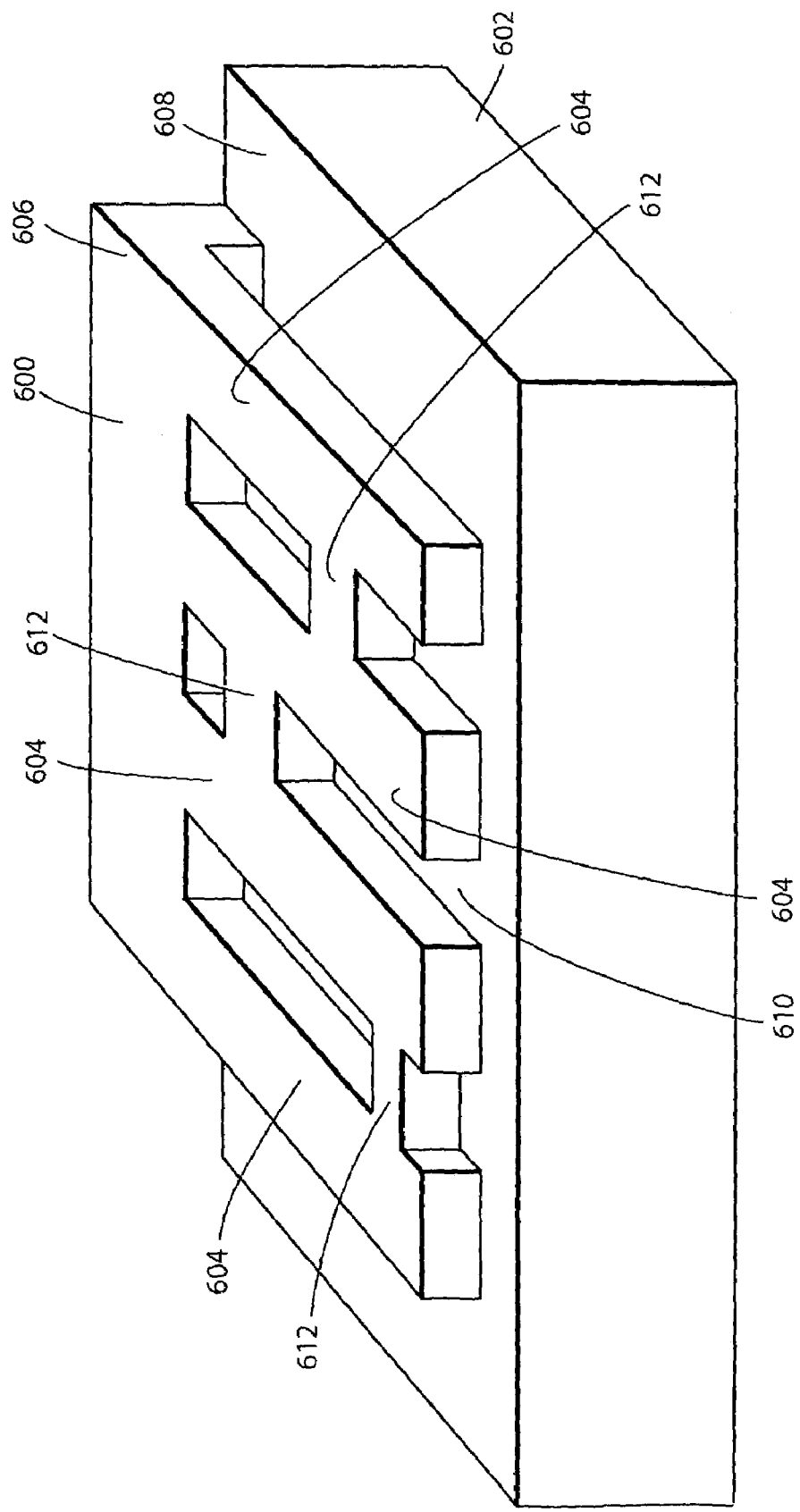
FIG. 8 is a perspective view of a diffraction grating showing an exemplary cantilevered mount using an anchor portion.

To set forth a general diffraction grating actuator, FIG. 8 shows an exemplary diffraction grating 600 mounted to a substrate 602 (partially shown) having input and output waveguides similar to those described above. The substrate 602 has at least one buried input waveguide 601 extending in a first direction and plane and at least one buried output waveguide 603 extending in a second direction and plane different than the first plane. The waveguides 601 and 603 are shown in FIG. 9. The output waveguide 603 extends in a plane out of the paper and is, thus, only shown in phantom. The two waveguides 601 and 603 have portions adjacent one another, e.g., directly coupled to one another to allow for switching of an optical signal from one into the other. Each of the waveguides 601 and 603 propagates an optical signal under total internal reflection within the substrate 602.

Here, strips 604 (partially shown) are suspended from suspension member in the form of a rigid anchor portion 606 affixedly mounted to a top surface 608. This is a cantilevered configuration in which the strips 604 extend outward from the anchor portion 606 and are free standing above the substrate 602. The strips 604 are close enough to the substrate 602 that the diffraction grating 600 is biased to the switching position, i.e., the strips 604 are within the evanescent field of a 1550 nm or 1310 nm light wave traveling within the substrate 602 under TIR.

Cross connections 612 are formed between the strips 604 extending over a TIR (or region in the top surface) region 610 to add structural rigidity. Below, the total internal reflection region 610, the input waveguide 601 and output waveguide 603 intersect. With the cross connections 612, the strips 604 can be made to move in unison avoiding twisting forces that could affect structures of such small size. For longer strips, there may be numerous cross connections between two strips. It is important for design configurations to avoid placing the cross connections 612 in a closely formed periodic fashion, however, as the cross connections 612 would collectively act as a diffraction grating, orthogonally oriented to the grating formed by the strips 604.

The strips 604 may be formed of silicon dioxide, which is transparent in the infrared region and can be readily fabricated with standard 0.5 $\mu$m to 1 $\mu$m line-width photolithography MEMS manufacturing processes. By way of example, the strips 604 can be formed by deposition of a film of silicon dioxide on the substrate 602. The substrate 602 may be quartz, for example, as well as other known substrate materials within which a waveguide may be formed. Standard photolithography techniques can form the desired pattern in a photoresist layer, and the pattern can be etched into the silicon dioxide with standard MEMS etching techniques similar to the commercially available multi user MEMS process (MUMPs™). In fabrication, a sacrificial layer, or spacer layer, will be deposited on the substrate top surface, between the silicon dioxide and the fused quartz. This layer may be silicon nitride and is etched or dissolved to release the silicon structure from the substrate 602. The substrate 602 formed of a material like quartz is resistant to etching processes and allows the sacrificial layer to be dissolved without etching of the substrate. Any etching of the substrate 602 would create a faint diffraction grating pattern that would not allow the switch to be turned fully off, as desired. The sacrificial layer can be dimensioned to position the diffraction grating in the switching position or the device can be constructed so that it is biased into the switching position with polysilicon spring elements. Preferably, the strips 604, rigid anchor portion 606, and cross connections 612 are formed of the same material, most preferably a silicon dioxide material. Other suitable materials include amorphous silicon, crystalline silicon, alumina, sapphire, silicon nitride, or poly-silicon/poly-germanium alloy, as well.

Further, small bumps may be formed on the underside of the diffraction grating 600 by patterning small depressions into the sacrificial layer before depositing the polysilicon layer. As stated above, these bumps minimize sticking during the release operation and during subsequent switch operation. A bump 613 is shown on strip 604, in the example of FIG. 9.

To move the diffraction grating 600 from the switching position to the non-switching position, an electric field may be applied via an electrode disposed above the strips 604. As the strips 604 may be formed with an additional insulating layer and a partially conductive layer and, thus, will deflect away from the top surface of the substrate 602 under application of an electric field. As the evanescent field above the total internal reflection region 610 tapers exponentially, the strips 604 need only deflect a small distance to place the diffraction grating 600 in the non-switching position.

FIG. 9 shows a technique for deflecting the strips 604 using an electrode 614 positioned, at least, above a distal portion of the strips 604, and extending into and out of the illustration across all strips 604. The electrode 614 is mounted at a bottom surface of an insulating mounting plate 616, which is formed over a support member 618. The support member 618 may be formed of the same material as the anchor member 606, and in the illustration is opposite the same. A second electrode, not shown, could surround the periphery of the grating 600, for example by being positioned on or adjacent the outer most strips thereof. The electrode 614 would receive instructions from a drive circuit and apply an electric field, between the second electrode, to the strips 604 in response thereto. To ease implementation, the strips 604 could be connected to a ground voltage. Further, electrode 614 could extend longitudinally down the length of the strips 604 as shown.

FIGS. 10 and 11 show an alternative means to actuate a diffraction grating for switching. In these embodiments, the flex used for switching is not in the strips forming the diffraction grating, as with FIG. 9, but rather is with the structure connecting the strips to the top surface of the substrate. For example, a diffraction grating structure 700 has strips 702, cross connections 704, and side portions 706 and 708, which may be formed of the same materials and in a similar way to that of the diffracting grating structure 600 described in FIG. 9. The grating 700 may be actuated as shown in FIG. 11.

FIG. 11 shows a mounting structure, or suspension member, having two mounting bases 710 and 712 formed on a substrate 714. A mounting plate 716 is formed on the bases 710, 712, which may be rigid mounting members. The substrate 714 has at least one buried input waveguide 713 extending in a first direction and first plane and one buried output waveguide 715 extending in a second direction and second plane different than the first plane. The output waveguide 715 extends out of the illustration and is, thus, shown in phantom. The two waveguides 713 and 715 have ends that are adjacent one another, e.g., directly coupled to one another to allow for switching of an optical signal from one into the other. Each waveguide 713, 715 would propagate the optical signal under total internal reflection.

The diffraction grating 700 is coupled to the mounting bases 710 and 712 via flexible members 718. The flexible members 718 could be any number of MEMS processed springs, membranes, or structures that may flex. The flexible members 718 could allow bi-directional, up and down, or single direction deflection. A first electrode 720 is mounted to the mounting plate 716 and, in this embodiment, is shown extending transversely and longitudinally across the strips 702, which would be grounded. A second electrode 721 may be mounted on the periphery of the grating 700, for example, on the flexible members 718. In such a configuration, the diffraction grating 700 could be biased in the "on" or switching position and moveable to a non-switching position under an electric field formed between the electrode 720 and the electrodes 721. The diffraction grating 700 could, alternatively, be biased in the non-switching position or the diffraction grating 700 could be biased for both upward and downward movement under control of the electrodes 720 and 721. The diffraction grating 700 could have bumps 722 formed on a bottom surface to prevent stiction between the diffraction grating 700 and the substrate 714 during operation.

FIG. 12 shows an alternative actuation structure for a diffractive optical element 800. The diffractive optical element 800 is formed of the same materials and in a similar manner as previously mentioned. Typical lateral dimensions for the diffractive optical element 800 would be 20 to 1000 µm. Strips 802 extend along a length of the diffracting grating 800 and cross connections 804 to add structural rigidity. A plurality of flexible members 806, in the form of spring arms in the illustrated example, are connected to the diffractive optical element 800. The flexible members 806 are also connected to the top surface of a substrate 808—substrate 808 having input and output waveguides for propagating an optical signal under total internal reflection as previously described. Specifically, feet 810 serve as posts for the arms 806 and have a height, in the preferred embodiment, sufficiently small to bias the diffractive optical element 800 in the "on" position. The geometry and size of the spring arms 806 are chosen to allow the diffractive optical element 800 to deflect into the "off" position under application of an electric field. As will be appreciated by persons of ordinary skill in the art, many other geometries may be used to achieve the desired flex and spring bias for switching operation. To affect actuation, a first electrode could be mounted above the diffractive optical element 800 using an appropriate mounting structure, of which a structure similar to that shown in FIG. 11 is an example. A second electrode may be disposed on the diffractive optical element 800 or one may be positioned on the side of or adjacent to the element 800 for moving the same.

While electrostatic actuation is used in the preferred embodiment for diffractive optical element 800 movement, actuation may alternatively be affected by thermal, piezoelectric, or electro-optic actuation.

As can be seen from FIG. 12, due to the micron scales of the diffraction gratings herein, diffraction gratings in application would have many strips and, where used, many cross connections. Therefore, the above figures should be considered as exemplary showing a general number of strips, with the understanding that many strips, like in diffractive optical element 800, may be in fact be used.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. An optical switch comprising:
   a substrate;
   a first buried optical waveguide for propagating an optical signal, where said optical signal propagates in the first optical waveguide along a first direction and under total internal reflection off of a first surface of the substrate at a total internal reflection region;
   a second buried optical waveguide extending in a second direction different than the first direction; and
   a diffractive optical element disposed above the total internal reflection region of the substrate and moveable relative thereto between a switching position above the substrate and in evanescent coupling with the optical signal propagating under total internal reflection off of the first surface wherein the optical signal is switched from the first optical waveguide into the second optical waveguide and a non-switching position wherein the optical signal reflects off of the first surface under total internal reflection and within the first buried optical waveguide.

2. The optical switch of claim 1, wherein both the first buried optical waveguide and the second buried optical waveguide are disposed within the substrate to propagate the optical signal under total internal reflection within the substrate.

3. The optical switch of claim 1, further comprising:
   an optical fiber coupled to one of the first buried optical waveguide and the second buried optical waveguide.

4. The optical switch of claim 3, wherein the optical fiber is a single-mode optical fiber.

5. The optical switch of claim 1, further comprising a third buried optical waveguide disposed adjacent the total internal reflection region, such that the diffractive optical element being in the non-switching position couples the optical signal from the first buried optical waveguide into the third buried optical waveguide via total internal reflection.

6. The optical switch of claim 1, wherein the diffractive optical element has a grating period that is substantially equal to the wavelength of light of the optical signal in the substrate.

7. The optical switch of claim 1, wherein the diffractive optical element is formed of a plurality of strips forming a diffraction grating, where each strip has a substantially equal width and where each of the strips are spaced apart a substantially equal spacing.

8. The optical switch of claim 7, wherein the diffraction grating is suspended from an anchor fixedly mounted to the substrate.

9. The optical switch of claim 7, wherein the diffraction grating is suspended from a first anchor and a second anchor by flexible members, where both said first anchor and said second anchor are fixedly mounted to the substrate and where the flexible members allow movement of the diffraction grating between said switching position and said non-switching position.

10. The optical switch of claim 7, further comprising an electrostatic actuator disposed adjacent the diffraction grating.

11. The optical switch of claim 7, wherein the strips are formed of a material selected from the group consisting of amorphous silicon, crystalline silicon, and poly silicon.

12. The optical switch of claim 1, wherein the diffractive optical element has an index of refraction that is substantially equal to that of the first buried optical waveguide and that of the second buried optical waveguide.

13. The optical switch of claim 1, wherein the first buried optical waveguide and the first direction are in a first plane, and wherein the second buried optical waveguide and the second direction are in a second plane forming an acute angle with the first plane.

14. An optical switch comprising:
    a substrate having a plurality of intersection regions;
    a buried input waveguide within the substrate for propagating an optical signal under total internal reflection;
    a plurality of buried output waveguides within the substrate for propagating the optical signal, wherein each of the plurality of buried output waveguides is disposed adjacent the buried input waveguide at one of the plurality of intersection regions; and a plurality of diffractive optical elements, each diffractive optical element disposed above one of the plurality of intersection regions, and each diffractive optical element is individually moveable relative to the substrate between a non-switching position and a switching position evanescently coupled to the optical signal propagating under total internal reflection off of a first surface of the substrate to couple the optical signal into one of the plurality of buried output waveguides.

15. The optical switch of claim 14, wherein each of the plurality of diffractive optical elements is formed of a set of strips, where each strip in the set of strips has a substantially equal width and substantially equal spacing to an adjacent strip.

16. The optical switch of claim 14, wherein the input waveguide extends from adjacent the first surface of the substrate to adjacent a second, opposing surface of the substrate to achieve the total internal reflection propagation within the substrate.

17. The optical switch of claim 16, wherein the plurality of output waveguides extend from adjacent the top first surface of the substrate to adjacent the second, opposing surface of the substrate to propagate the optical signal via total internal reflection.

18. The optical switch of claim 14, wherein the input waveguide has a first extent parallel to the first surface of the substrate and a second extent perpendicular to the first surface of the substrate.

19. The optical switch of claim 14, wherein at least one of the plurality of output waveguides has a first extent parallel to the first surface of the substrate and a second extent perpendicular to the first surface of the substrate.

20. A method of switching an optical signal comprising:
   forming a buried input waveguide in a substrate, the buried input waveguide extending in a first direction;
   forming a buried output waveguide in the substrate, the buried output waveguide extending in a second direction different from the first direction; and
   disposing a diffractive optical element adjacent the substrate for movement between a switching position above the substrate and evanescently coupled to the optical signal propagating under total internal reflection, wherein the optical signal propagating in the buried input waveguide is coupled into the buried output waveguide, and a non-switching position above the substrate wherein the optical signal propagating in the buried input waveguide is not coupled into the buried output waveguide.

21. The method of claim 20, wherein forming the buried input waveguide includes forming the buried input waveguide to extend from between a top surface of the substrate and a bottom surface of the substrate.

22. The method of claim 21, wherein forming the buried input waveguide includes forming the buried input waveguide to extend from between the top surface and the bottom surface.

23. The method of claim 20, further comprising:
   providing the diffractive optical element in the form of a diffraction grating having a grating period that is substantially equal to the wavelength of light of the optical signal in the substrate.

24. The method of claim 23, wherein the diffractive optical element comprises a plurality of strips each having a substantially equal width and a substantially equal spacing between an adjacent strip.

25. The method of claim 20, further comprising disposing an electrostatic actuator adjacent the diffractive optical element for moving the diffractive optical element between a switching position and a non-switching position.

* * * * *

UNITED STATES PATENT AND TRADEMARK OFFICE
CERTIFICATE OF CORRECTION

PATENT NO.       : 6,987,901 B2
APPLICATION NO. : 10/379284
DATED            : January 17, 2006
INVENTOR(S)      : Roger L. Frick It is certified that error appears in the above-identified patent and that said Letters Patent is hereby corrected as shown below:

On Title page item 56
<u>On the Second Page:</u>

Col. 2, Line 42
In Other Publications, 2$^{nd}$ reference, "betwee n" should be -- between --.

Col. 2, Line 48
In Other Publications, 5$^{th}$ reference, "Co mpact" should be -- Compact --.

Col. 2, Line 53
In Other Publications, 7$^{th}$ reference, "Fabricati on" should be -- Fabrication --.

<u>In the Specification:</u>

Column 1, line 47, "intersection" should be -- intersections --.

Column 2, line 13, "a" should be -- an --.

Column 5, line 32, ","" should be -- , --.

Column 7, line 8, " from" should be -- from a --.

<u>In the Claims:</u>

Column 10, line 8, "waveguide" should be -- waveguide, --.

Column 11, line 24, "top first" should be -- first --.

Signed and Sealed this

Sixteenth Day of January, 2007

JON W. DUDAS
*Director of the United States Patent and Trademark Office*